Figures 3, 4:
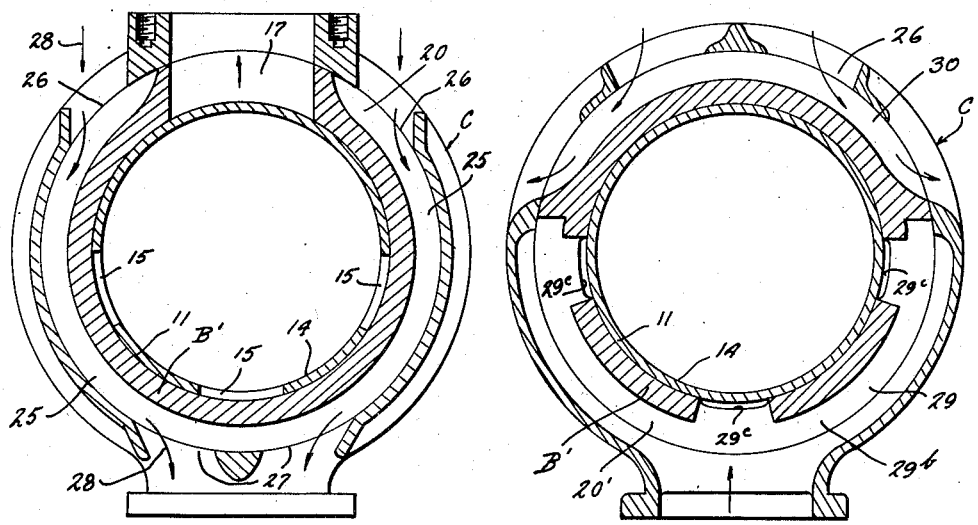

June 13, 1939.　　　A. J. MEYER　　　2,162,514
ENGINE
Filed Oct. 14, 1936　　　3 Sheets-Sheet 1
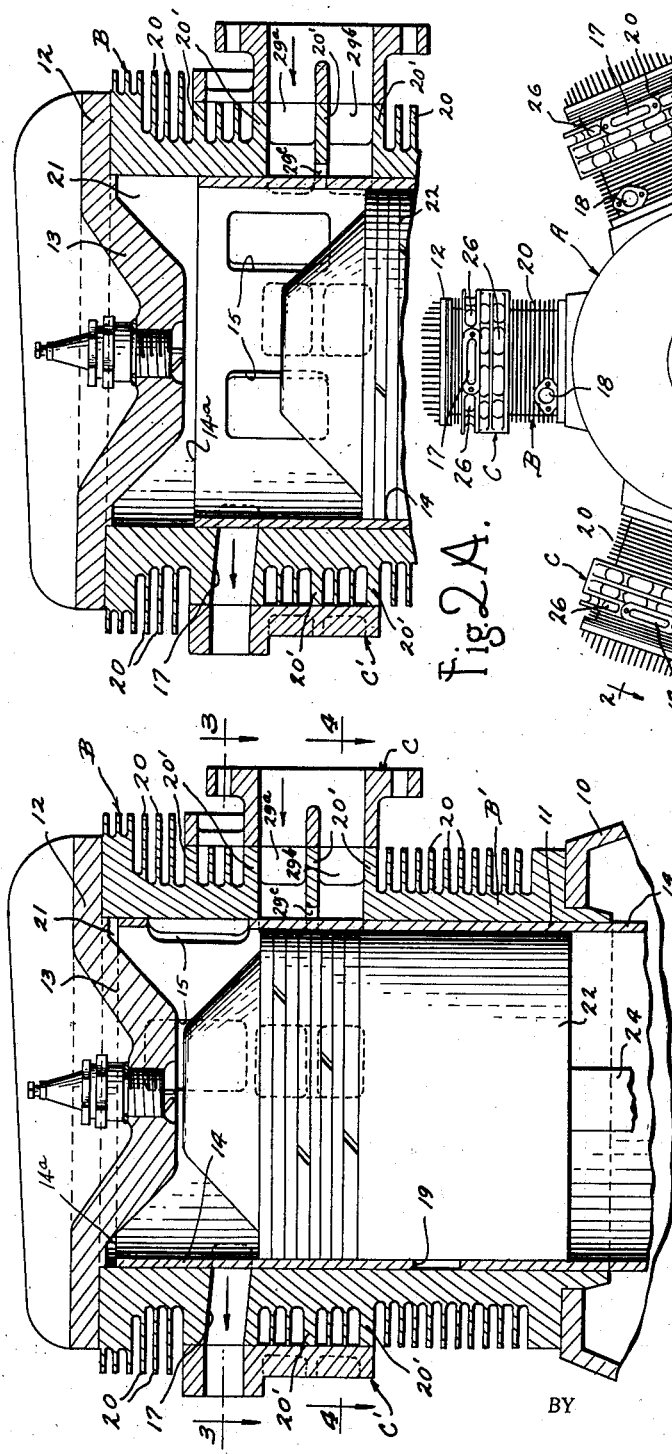
INVENTOR.
Andre J. Meyer
BY G. F. Hauke
ATTORNEY.

June 13, 1939.  A. J. MEYER  2,162,514
ENGINE
Filed Oct. 14, 1936  3 Sheets-Sheet 2

INVENTOR.
André J. Meyer
BY
ATTORNEY.

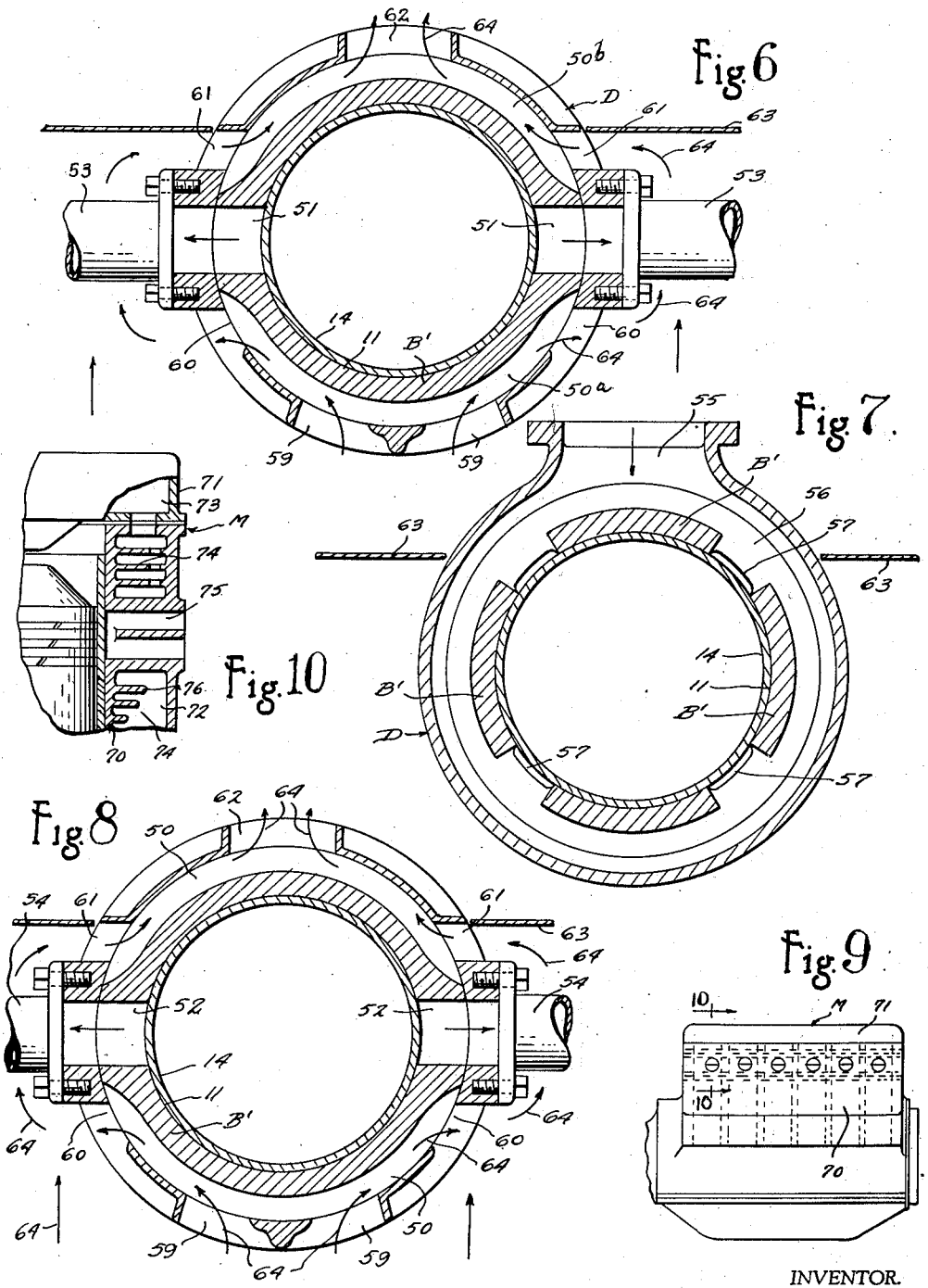

Patented June 13, 1939

2,162,514

UNITED STATES PATENT OFFICE 2,162,514

ENGINE

Andre J. Meyer, Grosse Pointe, Mich., assignor to Continental Motors Corporation, Detroit, Mich., a corporation of Virginia Application October 14, 1936, Serial No. 105,455

3 Claims. (Cl. 123—193)

My invention relates to engines and more particularly pertains to the cylinder structure and means for controlling cylinder distortion or warping when subjected to the influence of peak pressures and temperatures within the engine combustion chamber.

My invention in its more particular aspects is especially adapted for use with aircraft engines of the radial type, and more particularly with sleeve valve engines of the air cooled radial type, though it will be obviously understood that the principles of my present invention may be advantageously incorporated in engines other than the air cooled radial type and in engines other than those of the sleeve valve type. It will be noted that I have illustrated various embodiments of my invention and have particularly illustrated means for controlling distortion and warping of engine cylinders in engines of the radial type, in engines of the poppet valve type as contrasted with the sleeve valve type shown in the preferred embodiment, and in engines of the type having aligned cylinders.

In many engines, and especially in engines of the type used for powering aircraft and the like, it is noted that the peak pressures and temperatures attained in the present day engines are gradually mounting due to the gradual increase in compression ratios employed in such engines, and because of the fact that more and more power is sought to be developed from such engines. I find that this has resulted in cylinder distortion, which has gradually increased in direct proportion to the increase in peak pressures and temperatures developed in the combustion chamber, this resulting in undue piston ring wear, escape of compression, and oil leakage with a subsequent formation of sludge or other deposits that have seriously interfered with the efficient operation of such engines, the oil leakage resulting from distortion of the cylinder in a sleeve valve engine being particularly undesirable. Difficulties arising from such cylinder distortion, have proven very disadvantageous in engines of the sleeve valve type, and since the advent of sleeve valve engines, commonly referred to as the "flat head type", in which the cylinder head is provided with a substantially flat undersurface and which is not provided with a re-entrant head portion closely fitting the inner wall surface of the sleeve and masking the sleeve ports, these difficulties are more pronounced than ever, as the outer portion of the cylinder is directly exposed to these peak pressures and temperatures in the cylinder, and the sleeve valve means associated with engines of this type are not guided or supported by the cylinder head. Because of this latter fact, it is necessary to maintain relative close fits between the sleeve and cylinder in order to seal the combustion chamber space from the crankcase and efficient engine performance is relatively decreased on distortion of the cylinder which disturbs the fit between the sleeve valve means and cylinder, as well as between the sleeve valve means and piston. Such distortion has resulted in excessive oil consumption in this type of sleeve valve engine, this difficulty becoming more acute after the engine has been operated for extended periods of time.

It has been further noted that difficulties have arisen in connection with the cooling of air cooled radial engines and particularly in connection with the cooling of radial sleeve valve engines in which it is customary to operate the same with a relatively higher compression ratio so as to take full advantage of the inherent advantages of the sleeve valve engine over engines of the poppet valve type.

An object of my present invention is to provide for more efficient cooling of engines of the aforesaid type as well as to provide a cylinder structure in which the stresses in the cylinder wall are relatively reduced as compared with the conventional engine, when subjected to the peak pressures and temperatures in the combustion chamber, the reduction of these stresses eliminating the tendency of the cylinder becoming permanently distorted or warped.

Another object of my present invention is to materially improve engine efficiency and engine operating performance, as well as to decrease the oil consumption as compared with the conventional engine, by controlling cylinder distortion whereby to permit the operation of such engines with a relatively high compression ratio resulting in increased power output and improved engine performance.

More particularly the above objects are attained by providing means acting upon the cylinder structure to produce stresses in said cylinder structure which oppose the stresses introduced therein by reason of the pressure developed within the combustion chamber, whereby to relatively reduce the stresses in the cylinder wall where such stresses are the maximum and which are such as to usually cause a distortion which, in time, results in increasing oil consumption and a decrease in engine efficiency and performance.

In the present embodiment of my invention it will be noted that these stresses in the cylinder wall can be relatively reduced by means of a shrink ring which is assembled with the cylinder structure, or by means of suitable annular fins or other heat radiating devices of a similar character, or by the use of both the fins and shrink ring, these means serving to exert compressive stresses on the inner cylinder structure, which stresses oppose the stresses introduced therein by the explosion pressures in the engine combustion chamber, resulting in a relative decrease in such stresses in the cylinder wall.

It may be further noted that the present embodiment of my invention is particularly useful in connection with an air cooled radial sleeve valve engine, the construction of engines of this type being such as to permit the successful adaptation of my invention, whereby to obtain all the advantages inherent in such engines without any of the disadvantages attendant to the increasing of power output. More particularly, it may be noted that by reason of the present invention, an accurate fit may be always maintained between the moving parts of the engine, thereby providing an engine in which oil consumption is reduced to a minimum and in which wear of the moving engine parts is maintained at a minimum. Furthermore, such objects are attained with my invention without a sacrifice of engine efficiency, in fact, the general engine performance is materially improved, and the life of such engines is materially lengthened with respect to the present day engines.

Another advantage which is to be gained by adaptation of my present invention with a radial engine, is that the present embodiment may be satisfactorily employed in engines in which intercylinder baffles are employed, the present construction being particularly adapted for assembly with a substantially flat intercylinder baffle which is very readily and quickly assembled with the engine. Heretofore, such intercylinder baffles have been of such complicated construction that after the engine has been serviced a few times which necessitates the removal of such baffles, these baffles are so distorted or warped out of shape as to necessitate the assembly of new baffles with every overhaul of the engine. In the present construction the intercylinder baffles may be removed and assembled a great number of times without distorting or warping the same, and furthermore, such intercylinder baffles can be more readily assembled thereby facilitating maintenance and other servicing of such engines.

This application is a continuation in part of my prior application, Serial No. 715,584, filed March 15, 1934.

For a more detailed understanding of my invention, reference may be had to the accompanying drawings which illustrate one form which my invention may assume, and in which:

Fig. 1 is a front elevational view of a radial air cooled engine incorporating my present invention and particularly illustrating a radial air cooled engine of the sleeve valve type.

Figure 5:
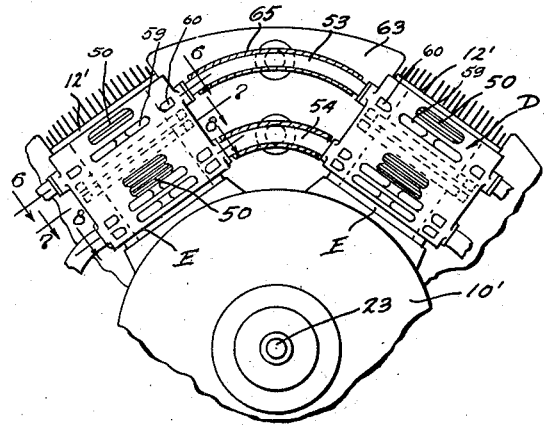

Fig. 2 is a typical longitudinal sectional view through an engine cylinder, particularly illustrating an engine of the flat head sleeve valve type and taken substantially on the line 2—2 of Fig. 1, Fig. 2A is a longitudinal sectional view similar to Fig. 2 but showing the relation of parts after the piston has moved part way inwardly of the cylinder during the engine power stroke, Fig. 3 is a transverse sectional view of a cylinder and the cooperating sleeve which is shrunk on to the cylinder and which particularly illustrates the forming of a cooling jacket about the cylinder through which a cooling medium may be circulated, this view being taken substantially on the line 3—3 of Fig. 2, Fig. 4 is another transverse sectional view illustrating the specific embodiment of my invention and taken on the line 4—4 of Fig. 2, through the intake, this view particularly illustrating the cooperative relation of the shrunk on sleeve in connection with the intake and associated intake passage or passages, Fig. 5 is a fragmentary elevational view of an air cooled radial engine showing a further modified form of construction, Figs. 6, 7 and 8 are transverse sectional views of the engine construction illustrated in Fig. 5 and taken respectively on the line 6—6, 7—7 and 8—8 of Fig. 5, Fig. 9 is a side elevational view of a multi-cylinder engine having aligned cylinders, and Fig. 10 is an enlarged fragmentary sectional view thereof taken substantially on the line 10—10 of Fig. 9 and showing fins within the cooling jacket around the engine cylinder.

Referring more particularly to the engine construction illustrated in Figs. 1 to 4 inclusive, it will be noted that I have shown my invention in connection with a sleeve valve engine A having a crankcase 10 and a cylinder structure B, said cylinder structure being arranged to be secured to the crankcase 10 in any suitable manner. The cylinder structure B includes a cylinder 11 and a cylinder head 12, the head being preferably bolted or otherwise secured to the cylinder block B' and it will be noted that the cylinder head is preferably provided with a depending head portion 13 projecting inwardly of the cylinder, but it is further noted that this re-entrant head portion is not fitted or constructed for engagement with the inner wall surface of the sleeve valve means 14, which is operable in the engine cylinder. The sleeve valve means is provided with suitable intake ports 15 which are arranged for cooperation with the cylinder intake ports 16. The engine as herein illustrated is provided with the outer exhaust port 17 and inner exhaust port 18, the sleeve being provided with an exhaust port 19 cooperating with the inner cylinder exhaust port 18, and the top edge 14a of said sleeve valve means is preferably utilized for controlling the outer cylinder exhaust port 17.

It will be noted that in this embodiment of my invention, the cylinder structure is provided with suitable annular air cooling fins 20 which substantially surround the cylinder and which serve to radiate heat originating within the combustion chamber. These fins 20 preferably extend radially with respect to the engine cylinder and form rings which substantially encircle the cylinder. It will be further noted that some of these fins are relatively thicker than the remaining fins, these thicker fins being shown at 20'. It will also be observed that these relatively thicker fins are preferably located in the vicinity of the cylinder outer end and are particularly located adjacent to the engine combustion chamber 21 for a reason that will be made more apparent hereinafter. The combustion chamber 21 in which the peak pressures and temperatures originate substantially during the first part of the power stroke, is particularly defined or bounded by the cylinder, the cylinder head, and the piston 22.

Incidentally it may be noted that the piston is connected with the engine crankshaft 23 by means of a connecting rod 24 and in the present embodiment of my invention the piston is utilized for at least partially controlling the sleeve valve intake and exhaust ports, but insofar as the present invention is concerned, it will be obviously understood that the particular type of piston, the particular type of sleeve valve means, and the particular type of cooperative action of said piston and sleeve valve means is not a part of the present invention since the principles of my invention may be incorporated in engines other than the type particularly illustrated, except that the present invention is of special significance in connection with sleeve valves having ports through which high combustion chamber pressures are communicated directly with the cylinder.

In order to control the distortion of the cylinder, I have preferably employed a sleeve or other suitable member C, such member being referred to in the appended claims and hereinafter in the specification more particularly as a shrink ring. This shrink ring is preferably shrunk onto the cylinder structure, and in the present embodiment of my invention, it will be noted that the shrink ring is arranged to be shrunk onto the fins carried by the cylinder structure, the relatively thick fins 20′ being of such a character as to provide an adequate support for the shrink ring and being of such strength as to not bend or distort under the pressure of the shrinking operation. It will be noted that I have preferably employed a shrink ring which is associated solely with that portion of the cylinder structure in the vicinity of the combustion chamber, since it is this portion of the cylinder structure in which the stresses internally thereof are sought to be controlled for controlling cylinder distortion.

In engine operation, the peak pressures in the combustion chamber stress the cylinder structure, these stresses being at a maximum in the cylinder wall and gradually decreasing in amount outwardly of the cylinder wall. During engine operation, these stresses are variable from a maximum to zero in direct proportion to the variation in pressures within the combustion chamber from a maximum or peak during the early portion of the power stroke to approximately twenty to twenty-five percent of peak values near the end of the power stroke, and it will be readily seen that the cylinder is deflected or distorted by these stresses, and because of these relatively high stresses, it has been found that the cylinder will eventually take a set in such a deflected or distorted condition. Peak pressures normally occur substantially about 20° to 30° past top dead center, and destructive high pressures are present in the engine cylinder during at least one-third of the power stroke. By destructive high pressures, I mean such pressures which are in excess of approximately 250 lbs. per square inch.

Referring to Figs. 2 and 2A, it will be noted that the sleeve intake ports are exposed to these destructive high pressures, and in the engine illustrated the destructive pressures as well as the peak or maximum pressure is directly communicated to the cylinder wall through these sleeve intake ports, since as shown, said sleeve intake ports are lying substantially in the plane of the upper cylinder exhaust port 17.

By employing this shrink ring, which is shrunk onto the cylinder structure, I am able to materially decrease or reduce this maximum stress in the cylinder wall, and also to more or less restrain the total distortion or deflection. It will be noted that the shrink ring on being shrunk onto the cylinder produces stresses in the cylinder structure which oppose the stresses produced therein by the pressure within the combustion chamber, thereby effecting a relative reduction in the resultant stresses in the cylinder wall. I find that by decreasing or reducing the stresses in the cylinder wall, that the cylinder is only momentarily distorted or deflected, the same springing back to its original shape when the period of peak pressure and destructive pressures in the combustion chamber is terminated. Thus, the cylinder does not take a permanent set as is the case with one in which the stresses are not reduced by means of this shrink ring or other devices acting to reduce the stresses in the cylinder wall.

It will be noted that even though the shrink ring acts to partially restrain the distortion of the cylinder, I depend principally on the fact that this shrink ring introduces stresses in the cylinder structure which tend to reduce the maximum stresses developed in the cylinder wall by the destructive pressure originating in the combustion chamber and particularly communicated to the cylinder wall through said sleeve valve ports.

The cylinder distortion may also be controlled by means of the cooling fins 20 and 20′, and in some embodiments of my invention I may prefer to employ cooling fins alone without a shrink ring, while in other embodiments I may prefer to employ the fins in conjunction with a shrink ring. I find it preferable to employ a cooling jacket around the cylinder in conjunction with these cooling fins in order that an efficient dissipation or radiation of heat may be attained, these fins preferably extending within the jacket and disposed annularly around the cylinder. The fins are constructed with a sufficient depth radially of the cylinder to provide a temperature differential between the cylinder wall and the portions of said fins most remote from the cylinder wall. In practice, I find that a temperature differential of approximately 150° F. may be easily obtained when employing these fins in conjunction with a cooling jacket.

It will be observed that these fins radiate the heat conducted through the cylinder wall from the combustion chamber and dissipate such heat to the cooling medium circulated through the jacket associated therewith. This rapid radiation of the heat from the fins into the cooling medium results in the reduction of temperature in the fins adjacent the peripheral portion thereof and consequently the thermal expansion of this fin portion is relatively less than that of the cylinder wall, which is sufficient to exert an appreciable compressive stress in the cylinder structure, which opposes the stresses produced in the cylinder structure by the destructive pressure within the combustion chamber, thereby acting to relatively reduce the stresses in the cylinder wall.

In the present embodiment of my invention as shown in Figs. 1-8 inclusive, it will be noted that the fins and shrink ring both cooperate to reduce the stresses in the cylinder wall, the construction being such as to particularly reduce the stresses in the cylinder wall which bounds the combustion chamber. In other modifications of my invention as hereinafter described, it will be noted that the fins are utilized solely for producing these stresses which counteract the stresses produced in the cylinder structure by the pressure in the combustion chamber, and it will be observed that very satisfactory results can be obtained by the use of fins alone without the aid of the shrink ring. In many constructions however, the shrink ring is preferably employed in conjunction with the fins, and it is noted that in aircraft engines and particularly in engines of the radial type of relatively large power output, the shrink ring is particularly useful in obtaining the desired results.

The character and physical properties of the material used in the engine construction, and the character and physical properties of the cooling medium utilized are important factors which determine the construction most desirable.

As stated above, it is desirable to provide a jacket associated with these cooling fins through which the cooling medium may be circulated in contact with the fins in order to increase the efficiency of the cooling. The shrink ring shown in the present embodiment of the invention is very advantageously employed in conjunction with this cooling jacket, since the assembly of such a shrink ring to the cylinder structure provides an efficient and economical construction for providing an adequate cooling jacket, this construction being particularly advantageous in connection with the construction of a sleeve valve engine of the radial type.

Referring more particularly to Figs. 3 and 4, it will be noted that the shrink ring C is fitted around the cylinder structure and cooperates with the fins 20 and 20' to provide the passages 25 through which a cooling medium or fluid is circulated, these passages preferably extending around the cylinder. The shrink ring is provided with inlets 26 to either side of the exhaust port 17 and with outlets 27 which are preferably arranged to lie substantially diametrically opposite to the inlet ports or openings 26. The direction of air flow utilized for cooling the engine particularly illustrated herein, is preferably shown by arrows 28, and since the shrink ring is of such a construction as to provide for more efficient contact of the cooling fluid with the fins carried by the cylinder structure, it will be readily seen that more efficient cooling of the engine is had by a construction of this character. In Fig. 4 it will be noted that the shrink ring is constructed in such a manner as to cooperate with the fins and with the intake passage 29 of the cylinder structure so as to provide a cooling jacket portion 30 of a segmental character, the flow of the relatively cool intake gas through the intake passages 29 being here utilized for cooling the engine in place of the cooling fluid employed in passages 25.

It may be noted that one of the relatively thicker fins 20' extends longitudinally through the intake passages 29 and substantially divides said intake passages into similar but parallel intake passages 29a and 29b, this fin which extends into the cylinder structure serving to radiate heat from the intake gases. The passages 29a and 29b are preferably connected by a recess 29c formed in the fin 20' within the intake passage.

In Figs. 5 to 8 inclusive I have illustrated a further modified form of construction, and in this showing of my invention it will be noticed that I have provided a shell D which preferably extends the full length of the cylinder structure as clearly shown in Fig. 5. In this construction it will be noticed that most of the fins carried by the cylinder structure are enclosed by the shell D, said shell D being preferably shrunk onto the fins 50 carried by the cylinder structure E. This cylinder structure E is preferably secured to the crankcase 10' in the usual manner and is further provided with a cylinder head structure 12' which is preferably similar in construction to the cylinder head, particularly illustrated in Fig. 2. The function of the shell D is similar to the function of the shrink ring C as described above.

This present modification is particularly adapted for use in connection with a radial air cooled sleeve valve engine of the type providing outer and inner exhaust ports and an intermediate inlet port or ports. The upper cylinder exhaust ports 51 are preferably arranged diametrically opposite to each other, and immediately above the lower or inner exhaust ports 52. Suitable manifolding structures 53 and 54 are respectively associated with the exhaust ports 51 and 52. The intake port 55 of the outer shell D communicates with the intake passage 56 that preferably extends completely around the engine cylinder and is communicated therewith through the annularly spaced intake ports 57. Ported sleeve valve means 14 are preferably associated in the engine cylinder structure E for controlling these intake ports 57 and outer and inner exhaust ports 51 and 52 respectively in a well known manner.

It will thus be noted that the shell is arranged for cooperative assembly with the engine structure and so co-acts with the fins 50 as to provide a plurality of passages through which a cooling medium may be circulated in contact with the fins 50. Some of these passages formed intermediate the fins 50 are segmental in character while others may extend completely around the cylinder. It will be further noted that this shell D cooperates with the intake passage 56 to provide an enclosed intake manifold passage which is spaced axially of the cylinder from the jacket portions through which the coling fluid is circulated. Preferably the segmental jacket portions for the cooling fluid are located in a plane coinciding with a plane through the exhaust ports and the complete annular jacket portions are preferably located intermediate the intake manifold or intake passage 56 and the segmental passages cooperating with the inner exhaust ports. If desired, additional jacket portions may be employed for cooling that portion of the cylinder structure outwardly of the outer exhaust ports as particularly illustrated in Fig. 6.

More particularly it will be noted that the shell or sleeve D provides the segmental passages 50a adjacent the forward end of the engine with inlet and outlet openings 59 and 60 respectively, and the segmental jacket portions 50b adjacent the rear of the engine are provided with intake and outlet openings 61 and 62. An inter-cylinder baffle or plate 63 is preferably employed with radial engines of this character and preferably shuts off the gap or space between adjacent cylinders as shown in Fig. 5. The air flow is indicated by arrows 64 and it will be noted that the air flow is directed first through the intake opening 59 through segmental jacket passage 50a, out through the outlet opening 60, thence rearwardly of the engine where it is deflected by the plate 63 into the intake openings 61, thence through the rear segmental jacket passage 50b and is finally discharged through the outlet openings 62 at the rear of the engine.

Intercylinder baffles have proved very effective in increasing engine performance since baffles of this character provide for more efficient conduction of the cooling fluid such as the air currents utilized for cooling an air cooled radial engine, to the rear portion of the cylinder structure. By confining the air flow to these certain defined paths, the head resistance has been decreased and also more efficient cooling of the engine has resulted. Heretofore these intercylinder baffles have been of a complicated construction and have not been of such a character as to permit the ready installation of the same. In fact, these intercylinder baffles must be bent or otherwise distorted to fit the same to the engine, and thus, when the same have been removed a few times, it is found that they are of no use whatsoever, thus necessitating the replacement of the baffles with new ones. In the present construction it will be noted that I have been able to employ a substantially flat intercylinder baffle which is readily attached to the shell structure or shrink rings which are assembled with the cylinder structures. Each intercylinder baffle as proposed in the present application for patent is one which can be removed and assembled as many times as is necessary without the same becoming distorted or warped or otherwise bent so as to prevent its use again. A substantially flat intercylinder baffle is more efficient than one which is crimped or otherwise formed with an irregular contour such as is the case with those baffles now employed. The present intercylinder baffle is merely bolted to adjacent shell structures which are associated with the cylinder structures and it will be noted that it provides a substantially flat plate bridging the gap between said cylinder structures.

Referring more particularly to Figs. 9 and 10, it will be noted that I have illustrated my invention in connection with a multi-cylinder engine M of the type having aligned cylinders. Although I have illustrated my invention in connection with a sleeve valve engine it will be understood, however, that the principles of my invention may be advantageously incorporated in engines other than those of the sleeve valve type.

This engine M is provided with a cylinder structure 70, and a cylinder head 71, the cylinder structure and cylinder head being respectively provided with communicating jackets 72 and 73. Due to the fact that the stresses produced in the cylinder structure by the explosion pressure in the combustion chamber are of more magnitude in the vicinity of the combustion chamber at the outer end of the cylinder, it will be readily understood that it is this region where it is desirable to reduce these internal stresses in order to eliminate the permanent warping or distorting of the cylinder. This is accomplished by providing annular fins 74 extending into the jacket 72 through which the cooling medium is circulated. These fins may extend entirely across the jacket as shown above the intake port 75 or only part way as shown at 76 below the intake port, and it will be understood that in the appended claims this fin construction may be broadly defined as extending within the cooling jacket, since the function of these fins is the same in both instances. The fin construction more particularly depends on the character and physical properties of the material used. It may be noted that in the present embodiment of my invention, shown in connection with a sleeve valve engine, that one or more fins can be arranged to extend within the intake chamber as particularly shown in Fig. 10, if so desired. These fins 74 provide an appreciable temperature differential for reducing the stresses in the internal cylinder structure and prevent the permanent distortion of the cylinder. The operation and function of these fins 74 is substantially similar to operation and function of fins 20 and 20' as illustrated in Figs. 1 to 8 inclusive and described in the foregoing paragraphs.

It will thus be noted that the present invention provides a rather simple device for controlling engine cylinder distortion, the shrink ring or tension band being very readily shrunk onto the cylinder for placing the metal of the cylinder structure under an initial tension or strain for reducing the stresses in the cylinder wall and for restraining cylinder distortion.

It will be noted that the objects of my present invention may be accomplished by fins alone or by means of a sleeve or shell that is shrunk onto the external cylinder structure portion, and preferably I employ both the fins and shrink ring whenever possible.

If desired the manifold structures 53 and 54 may be wrapped or otherwise protected with an insulating material 65 as illustrated in Fig. 5 so that the air on passing the manifold from the outlet opening 60 to inlet opening 61 is not unduly heated by the hot exhaust manifold structures 53 and 54.

It will be further noted that a construction of the character described in the foregoing paragraphs may be readily assembled with engines of various types and can furthermore be conveniently located in the vicinity of the combustion chamber and co-act with that portion of the cylinder structure which is more closely adjacent to the region where relatively high peak pressures and temperatures occur. In the case of a sleeve valve engine, this region of peak pressures and temperatures usually occurs in that portion of the cylinder which carries the intake and exhaust ports, and thus the sleeve or shell which is shrunk onto the cylinder structure is preferably located in the region of said intake and exhaust ports, for reducing the stresses in that portion of the internal cylinder structure portion through which said port openings are formed.

It will be noted that the destructive pressures are periodically produced within the combustion chamber and communicated directly with the cylinder through the sleeve ports, these pressures overstressing the cylinder and to thus permanently distort same, which results in excessive clearance being formed between the cylinder and sleeve valve means. The shrink ring and/or fins provide stress controlling means by subjecting the cylinder to a stress opposing that induced by the destructive explosion pressure, and thus before the cylinder can be stressed the opposing stress set up by the shrink ring and/or fins must be first overcome. By reason of the present construction, the cylinder is never overstressed and therefore a control of the clearance between the cylinder and sleeve valve means is readily had.

It will be apparent to those skilled in the art to which my invention pertains that various modifications and changes may be made therein without departing from the spirit of my invention or from the scope of the appended claims.

What I claim as my invention is:

1. In an internal combustion engine, a cylinder structure including a cylinder ported at the side for intake and exhaust and a cylinder head for closing the outer open end of said cylinder and cooperating therewith to provide a combustion chamber adjacent to the cylinder outer end, valve means respectively cooperating with the cylinder intake and exhaust ports to control the engine cyclical events, a ring assembled with said cylinder structure and cooperating therewith to provide a fuel mixture intake chamber cooperating with said cylinder intake ports, and an annular fin about said cylinder and extending longitudinally within said intake chamber.

2. In an internal combustion engine, a cylinder structure including a cylinder ported at the side for intake and exhaust and a cylinder head for closing the outer open end of said cylinder and cooperating therewith to provide a combustion chamber adjacent to the cylinder outer end, valve means cooperating with said cylinder intake and exhaust ports and operable to control the engine cyclical events, said cylinder structure including an annular fuel mixture intake chamber cooperating with said cylinder intake ports, and an annular fin extending longitudinally within said intake chamber.

3. In an air cooled internal combustion engine of the type having a crankshaft and a plurality of angularly spaced cylinder structures disposed radially about the crankshaft, annular air cooled fins encircling each of said cylinder structures, a shell structure surrounding each of said cylinder structures and cooperating with said fins to provide annular passages through which the cooling air may be circulated in heat transference relation with said fins, and an intercylinder baffle located intermediate the shell structures of adjacent cylinder structures, said shell structures each having inlet opening means forwardly of said baffles and outlet opening means to the rear of said baffles.

ANDRE J. MEYER.